(12) United States Patent
Shah

(10) Patent No.: US 11,759,848 B2
(45) Date of Patent: *Sep. 19, 2023

(54) METHOD FOR INORGANIC BINDER CASTINGS

(71) Applicant: Lift Technology, Detroit, MI (US)

(72) Inventor: Jiten Shah, Aurora, IL (US)

(73) Assignee: Lift Technology, Detroit, MI (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/480,119

(22) Filed: Sep. 20, 2021

(65) Prior Publication Data

US 2022/0016694 A1    Jan. 20, 2022

Related U.S. Application Data

(63) Continuation-in-part of application No. 16/748,893, filed on Jan. 22, 2020, now Pat. No. 11,123,789.

(60) Provisional application No. 62/795,294, filed on Jan. 22, 2019.

(51) Int. Cl.
| | |
|---|---|
| B22C 7/02 | (2006.01) |
| B33Y 40/20 | (2020.01) |
| B22C 1/18 | (2006.01) |
| B22C 9/12 | (2006.01) |
| B33Y 80/00 | (2015.01) |

(52) U.S. Cl.
CPC ............ B22C 7/02 (2013.01); B22C 1/18 (2013.01); B22C 9/12 (2013.01); B33Y 40/20 (2020.01); B33Y 80/00 (2014.12)

(58) Field of Classification Search
CPC ............ B22C 7/02; B22C 1/18; B22C 9/12
See application file for complete search history.

(56) References Cited

U.S. PATENT DOCUMENTS

| | | | |
|---|---|---|---|
| 11,123,789 B2 * | 9/2021 | Cobett | B22C 1/188 |
| 2017/0165915 A1 * | 6/2017 | Deng | B29C 64/232 |
| 2017/0320128 A1 * | 11/2017 | Deters | C04B 35/14 |
| 2017/0333980 A1 * | 11/2017 | Yang | B33Y 80/00 |

* cited by examiner

*Primary Examiner* — Kevin P Kerns
*Assistant Examiner* — Steven S Ha
(74) *Attorney, Agent, or Firm* — Donald J. Lecher; BUTZEL

(57) ABSTRACT

A method for inorganic binder casting including selecting a shape-forming material based on pre-determined manufacturing and shape characteristics, forming the shape-forming material by printing the shape-forming material using a plurality of additive material printers to form a casting mold, creating a liquid binder solution, the liquid binder solution configured to include at least 51% inorganic binder material by weight, the inorganic binder material having a weight ratio to the liquid binder solution between a range of 1.0 and 3.5, coating the shape-forming material with the liquid binder solution, substantially dehydrating the shape-forming material, pouring a hot liquid metal into the casting mold, and allowing said hot liquid metal to cool to form a molded part.

19 Claims, 3 Drawing Sheets

METHOD FOR INORGANIC BINDER CASTINGS

RELATED APPLICATIONS

This application claims priority to U.S. provisional application No. 62/795,294, filed Jan. 22, 2019, and to U.S. non-provisional application Ser. No. 16/748,893, filed on Jan. 22, 2020 and issued as U.S. Pat. No. 11,123,789 on Sep. 21, 2021, which are hereby incorporated by reference in their entirety.

FIELD OF THE INVENTION

The present invention relates generally to a method for producing inorganic shapes using 3D printing techniques. More particularly, the invention consists of steps for preparing an inorganic binder casting to create an item using an shape formed using an inorganic binder solution, the solution being at least partially comprised of a preferred inorganic material and a preferred solvent, and further steps for coating the shape-forming material with the inorganic binder solution, dehydrating the coated material, and then pouring liquid metal into or onto the formed shape, causing the metal to solidify and cool, and then washing the item, reclaiming the inorganic binder and shape-forming material, and reusing both in subsequent steps of the invention.

BACKGROUND

Additive manufacturing devices, such as, but not limited to sand printers, may be used to produce various shapes utilizing organic binder systems, and/or inorganic binder systems that are hardened or cured by organic catalysts. When liquid metal is poured into cavities formed by these shapes, for producing metal castings, the organic portions of the binder system will pyrolyze and/or oxidize to create gases. Standard sand mixers may likewise be used to produce various shapes in the same fashion. The gases must be exhausted from the cavities being filled with metal to reduce pressure in the cavity, allowing the liquid metal to fill the cavity, and to reduce any reactions that may occur between the gases, the sand, or other shape-forming material, and the liquid metal. The invention can help minimize gaseous reactions and mold pressure caused by said gases by reducing the amount of organic material in the casting process. The invention can further help eliminate gaseous reactions and mold pressure by eliminating organic material from the casting process.

SUMMARY

One embodiment disclosed herein includes a method for inorganic binder casting that selects a shape-forming material based on pre-determined manufacturing and shape characteristics, forms the shape-forming material by printing the shape-forming material using a plurality of additive material printers to form a casting mold, creates a liquid binder solution, the liquid binder solution configured to include at least 51% inorganic binder material by weight, the inorganic binder material having a weight ratio to the liquid binder solution between a range of 1.0 and 3.5, coats the shape-forming material with the liquid binder solution, substantially dehydrates the shape-forming material, pours a hot liquid metal into the casting mold, and allows said hot liquid metal to cool to form a molded part.

One embodiment disclosed herein includes a method for inorganic binder casting that selects a shape-forming material based on pre-determined manufacturing and shape characteristics, forms the shape-forming material by printing the shape-forming material using at least one additive material printer to form an investment casting shell having a thin interior wall configured to receive a hot liquid metal, creates a liquid binder solution, the liquid binder solution configured to include at least 51% inorganic binder material by weight, the inorganic binder material having a weight ratio to the liquid binder solution between a range of 1.0 and 3.5, coats the shape-forming material with the liquid binder solution, heating and substantially dehydrates the shape-forming material, pours the hot liquid metal into the investment casting shell, and allows said hot liquid metal to cool to form an investment casting part.

One embodiment disclosed herein includes a method for inorganic binder casting that selects a shape-forming material based on pre-determined manufacturing and shape characteristics, forms the shape-forming material by printing the shape-forming material using at least one additive material printer to form a casting mold, creates a liquid binder solution, the liquid binder solution configured to include at least 51% inorganic binder material by weight, the inorganic binder material having a weight ratio to the liquid binder solution between a range of 1.0 and 3.5, coats the shape-forming material with the liquid binder solution, heats the shape-forming material configured to polymerize the shape-forming material with the liquid binder solution and remove a substantial portion of the liquid binder solution, pours a hot liquid metal into the casting mold, and allows said hot liquid metal to cool to form a molded part.

DETAILED DESCRIPTION

Figure 1:
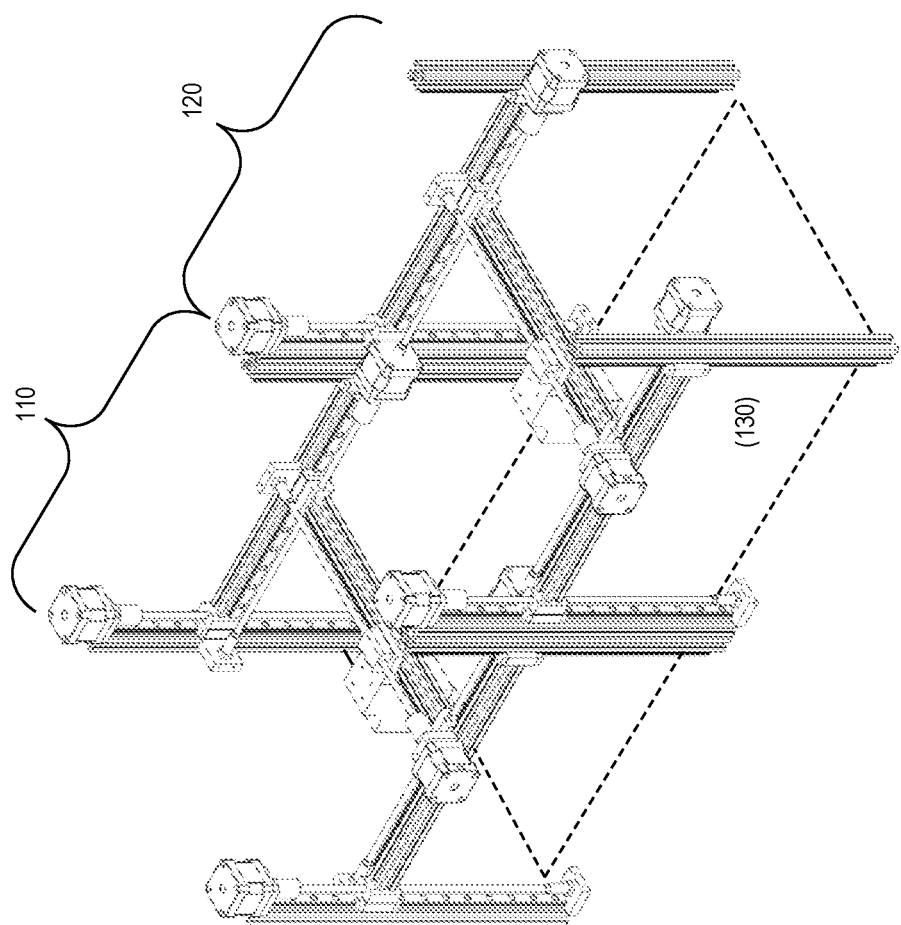
FIG. 1 illustrates an environment for inorganic binder casting including a plurality of XYZ-axis additive material printers that may perform the embodiments disclose herein.

This invention generally relates to a method for utilizing additive manufacturing and conventional shape-forming materials mixing techniques to produce various shapes from other shape-forming materials (e.g., sand) in the art of casting for producing shapes with a binder solution comprised of a substantial amount (at least 90% by-weight) inorganic material, further including multiple methods for dehydrating and curing said shapes, and methods for reclaiming and reusing shape-forming materials and inorganic material from the binder solution. As used herein, the term "mold" refers to the various shapes created with additive manufacturing techniques, or with traditional shape-forming materials mixing techniques, with a binder solution comprised of at least 51% inorganic material by weight of the binder solution.

Further shape-forming materials are contemplated to include all solid inorganic materials used in making casting molds, investment shell and cores, including but not limited to silica sand, zirconia, carbo-ceramics, spherical fly-ash dust or metallic powders, among other things.

Shape-forming material may be selected based on one or more manufacturing characteristic preferences as pre-determined by the user of the invention, such as surface finish, and being able to produce castings that result in a thin wall, as thin as 2 mm.

When printing the selected shape-forming material, the user may further select a casting shape based on design characteristics known in the art of casting, such as casting wall length, casting depth, and casting cooling and solidifying characteristics.

The invention includes a mold that is substantially inorganic and substantially free of moisture (at least 90% by weight) at the time of casting. As used herein, the term "substantially dry mold" refers to a mold that is substantially free of moisture at the time of casting.

In a mold that is not 100% inorganic, the casting mold can include organic additives such as, but not limited to, e.g. cellulose, carbohydrates, esters, carbons, phenolics, saw dust, starch, ester, sugar, graphite, sea coal, or other additives which can premixed into the inorganic material.

This invention further relates to a method for utilizing additive manufacturing and conventional shape-forming materials mixing techniques to produce molds and cores from shape-forming materials with a binder solution comprising 100% inorganic material, multiple methods for curing said shapes, and methods for reclaiming and reusing shape-forming materials and inorganic material. As used herein, the term "inorganic mold" refers to molds created with additive manufacturing techniques, or traditional shape-forming materials mixing techniques, with a solution of 100% inorganic material.

The invention further establishes a mold or inorganic mold completely free of moisture at the time of casting. As used herein, the term "dry mold" refers to a mold that is completely free of moisture at the time of casting, and the term "dry inorganic mold" refers to an inorganic mold that is completely free of moisture at the time of casting.

There are several inorganic binder materials that have been used as bases for binder solutions in the foundry industry, where a base for binder solutions is that material that comprises the majority of the binder solution by weight. In some present-day solutions, inorganic materials are not the only material in the solution, and other materials, including organic materials, such as, but not limited to, cellulose carbohydrates, esters, carbons, or phenolics, may also be present in the solution. A variety of inorganic binder materials are contemplated by this invention.

In accordance with the present invention, the method can include a first and a second step for creating a mold and/or inorganic mold: printing and dehydration.

The at least first and second steps can include printing shape-forming materials and 100% inorganic binder solutions layer-by-layer or printing shape-forming materials that is pre-coated with the inorganic binder solution, from an additive manufacturing device, or with a traditional shape-forming materials mixing technique, and pre-heating, post-heating, pre-heating a curing agent, dehydrating by chemical reaction, or a combination of all four methods, the shape-forming materials and inorganic binder prints by chemical, conductive, convective, or radiative means.

The at least first and second steps can alternatively include printing shape-forming materials and any of the described binder solutions layer-by-layer, or printing pre-coated shape-forming materials, from an additive manufacturing device, or traditional shape-forming materials mixing technique, and pre-heating, post-heating, pre-heating a curing agent, dehydrating the casting mold by chemical reaction, or a combination of all four heating methods, the casting mold with binder solutions by chemical, conductive, convective, or radiative means.

Said chemical means includes the use of $CO_2$ applied through moving nozzles of the additive manufacturing machine or applied directly to a mold created using a traditional sand mixing technique.

As discussed below, an at least third step can be added after formation of the above-stated molds, such that hot liquid metal may be poured into the casting mold, allowed to cool forming a casting without creating a substantial amount of organic gases. The at least third step also contemplates the pouring of hot liquid metal into the casting mold and allowing the metal to cool resulting in a casting without creation of any organic gases.

In another possible step of the present invention, after casting, casting washing the casting mold with water may be performed. The additional step can be performed with cold water, at least cooler than 60 degrees Fahrenheit. The additional step may also be performed with other solvents known in the art of casting.

In yet another possible step of the present invention, the shape-forming materials coated with a binder solution of the invention may be washed from the casted product, and shape-forming materials and binder materials may be separated, reclaimed, and reused at a rate of near 100%.

This invention contemplates a binder solution of a substantial amount (at least 90% by-weight) of sodium silicate ($Na_2O\ SiO_2$) binder material dissolved in water to serve as the casting mold binder material. When a binder solution comprising at least a substantial amount of sodium silicate is used in this invention, a negligible amount of gas, or no gas, is produced in the casting mold, or dry mold, when high temperature liquid metal is introduced therein.

This invention further contemplates a binder solution of a partial amount (at least 51% by-weight) of sodium silicate ($Na_2O\ SiO_2$) binder material dissolved in a solvent to serve as the inorganic mold binder solution. As with all inorganic binder material solutions contemplated by this invention, a negligible amount of gas, or no gas, is produced in the casting mold, or dry mold, when high temperature liquid metal is introduced therein.

This invention further contemplates a binder solution of 100% sodium silicate ($Na_2O\ SiO_2$) binder material dissolved in water to serve as the inorganic mold binder solution. As with all inorganic binder materials contemplated by this invention, a negligible amount of gas, or no gas, is produced in the dry mold or dry inorganic mold when high temperature liquid metal is introduced therein.

Binder solutions used in the invention have an optimum weight ratio.

Binder material with weight ratios between 1.0 and 3.5 may be used. One such preferable weight ratio of sodium silicate when used as an inorganic binder solution material, is between 2.2 and 1.8 parts $SiO_2$ to 1.0 parts $Na_2O$. Weight ratios contemplated for this invention are preferred to allow for cold solvent solubility of the binder material after it has been dehydrated or fused to a glass. The preferred ratios of the binder material, specifically sodium silicate, have weight ratios such that they are neither insoluble in cold water, nor hygroscopic. The various binder solutions contemplated by this invention are further contemplated to be of a low viscosity. The preferred solvent contemplated by this method is cold water for the low-viscosity solution.

Cold water solubility of the inorganic binder material is a preferred element of this invention.

The invention contemplates at least two sub-processes for applying the invention to commercial applications, or otherwise deploying the invention.

The binder solutions contemplated by this invention can be applied layer-by-layer to the shape-forming material in the additive manufacturing device to form a mold or inorganic mold. The casting mold can be dehydrated by one of two methods.

Pre-heating the shape-forming materials to a temperature (range 100° F. to 500° F.) can be deployed to immediately dehydrate the binder.

Pre-heating the shape-forming materials to a temperature to allow for the latent heat of the shape-forming materials, to cause the eventual dehydration of the binder, can be deployed to dehydrate the shape-forming material coated with the binder solution over time—based on the size of the casting mold or inorganic mold.

Post-heating can be deployed to a mold or inorganic mold. One such deployment of post-heating may be by radiative means. Radiative means for post heating includes traveling, focused, form of energy. One such form of energy may come from the group consisting of microwaves, laser beams, infra-red light, an arc lamp or electron beams.

Post-heating may also be accomplished through conductive means or convective means. Once such conductive means for post-heating a mold or inorganic mold is a heated plate applied to the surface of the casting mold or inorganic mold. One such convective means for post-heating a mold or inorganic mold is baking the casting mold or inorganic mold. Additional conductive and convective post-heating means include those known in the art of casting.

Post-heating may also be accelerated by applying a $CO_2$ gas, inorganic acids or inorganic salts to the casting mold or inorganic mold.

Binder solutions can be applied to shape-forming materials in a batch or continuous shape-forming materials mixer, where the shape-forming material is heated prior to or during mixing to cause the evaporation of the water. As evaporation occurs, the shape-forming material becomes dehydrated further becomes a pre-coated shape-forming material, which can be used in the additive manufacturing device or when traditional sand mixing techniques are used as described by this invention. The additive manufacturing device will print water onto the pre-coated shape-forming materials, resulting in instant re-solubilization (where solubilization is the end-state of the process of re-solubilizing). Damp shape-forming materials may then be pre-heated or post-heated to properly dehydrate prior to pouring casting into the printed mold.

Pre-coating shape-forming materials with the binder solutions contemplated by this invention may be done using microwave mixers. Certain binder materials have unusually high dielectric constant values. Sodium silicate is one such material. These mixers allow for the product to be mixed and heated in one step, in one machine. Multi-step mixing and heating is also contemplated by this invention, where the entire batch of binder material and shape-forming materials are not mixed at one time, rather where smaller batches are mixed, and later combined in preparation for use in the additive manufacturing device.

Shape-forming materials of any grain fineness, or of any shape, or mineral type, may be bonded using techniques of this invention. The range of AFS GFN (American Foundry Society Grain Fineness Number) 40 to 120 is the preferred grain fineness. The preferred liquid inorganic binder material has a 2.0:1.0 weight ratio when bonded. A preferred set of inorganic binder materials are alkali metal silicates from the group consisting of lithium, sodium, and potassium silicates. The preferred inorganic binder material is sodium silicate. The mixture may become dehydrated by one of the above sub-processes to form a solid mass with a desired shape. A casting can then be poured within the solidified mold with hot liquid metal.

The invention contemplates complex casting shapes with strategic placement of rigging (venting, risering, and gating) without the use of standard tooling. Final placement of said rigging is printed as a part of the process steps for forming the casting mold or inorganic mold prior to casting in a fashion to optimize casting cooling and solidification.

After casting, the bonded shape-forming materials shape may be easily washed away from the solidified metal casting. The preferred method is to use cold water with minimal agitation. This process eliminates dust which is normally present in mechanical shape-forming materials crushing and abrasion, often referred to as a shakeout. Formation of the solidified mold, and the process for cold water washing with minimal agitation allows for specific, pre-defined, thin dimensions to be formed by castings.

Agitation can be used during washing, but with minimal agitation required.

The selected binder material is contemplated to be dissolved in a solvent, preferably water, with the binder material recovered, and reused.

After dissolving, the binder may be separated from the shape-forming materials through various means contemplated by this invention. Specifically, the binder material is condensed by water evaporation and inorganic material solids are collected for reuse. Other means for separating the binder material from the shape-forming material include boiling, vacuum extraction, flash condensation, super heating, and other means for separating known in the art.

After washing, separating the binder material, and recapturing the binder material, the shape-forming material may be dried and prepared for reuse.

Water-based reclaim systems are deployed to recapture shape-forming materials and binder materials. The invention further contemplates the use of specialty aggregates with unique physiological, thermal expansion and refractory properties to achieve additional benefits—cleanliness, high performance and close tolerancing castings.

The invention leaves a thin coating of binder material glass remaining on the surface of the casting after washing. The casted product is oxidation and corrosion resistant for at least a period of time.

Casting surface finish can be selected based on grain size of shape-forming materials.

The invention contemplates the reduction in cost of productions for aggregate shape-forming materials castings.

The invention allows for no dust, or negligible amounts of dust, in the casting process. The invention further allows for thin wall, less than 2 mm, castings. The invention further allows for close tolerancing.

The invention reduces the tooling, tooling costs, damage of castings during shake out and labor associated with production of castings.

The invention eliminates, or at least reduces, the formation of volatile organic compounds, $CO_2$, CO, methane and other biproducts of combustion from organic materials.

FIG. 1 illustrates an environment 100 for inorganic binder casting including a plurality of XYZ-axis additive material printers 110 and 120 that may perform the embodiments disclose herein. A first XYZ-axis additive material printer

110 may be positioned proximate a second XYZ-axis additive material printer 120 to enlarge a printable area 130 upon which a shape-forming material may be printed. For example, the first XYZ-axis additive material printer 110 may print at least a portion of the shape-forming material, while the second XYZ-axis additive material printer 120 may print at least another portion of the shape-forming material such that both additive material printers may print the complete shape-forming material for the inorganic binder casting. Both the first 110 and second 120 XYZ-axis additive material printers may be controlled from either a single controller or dual respective controllers configured to print the complete shape-forming material.

Figure 2:
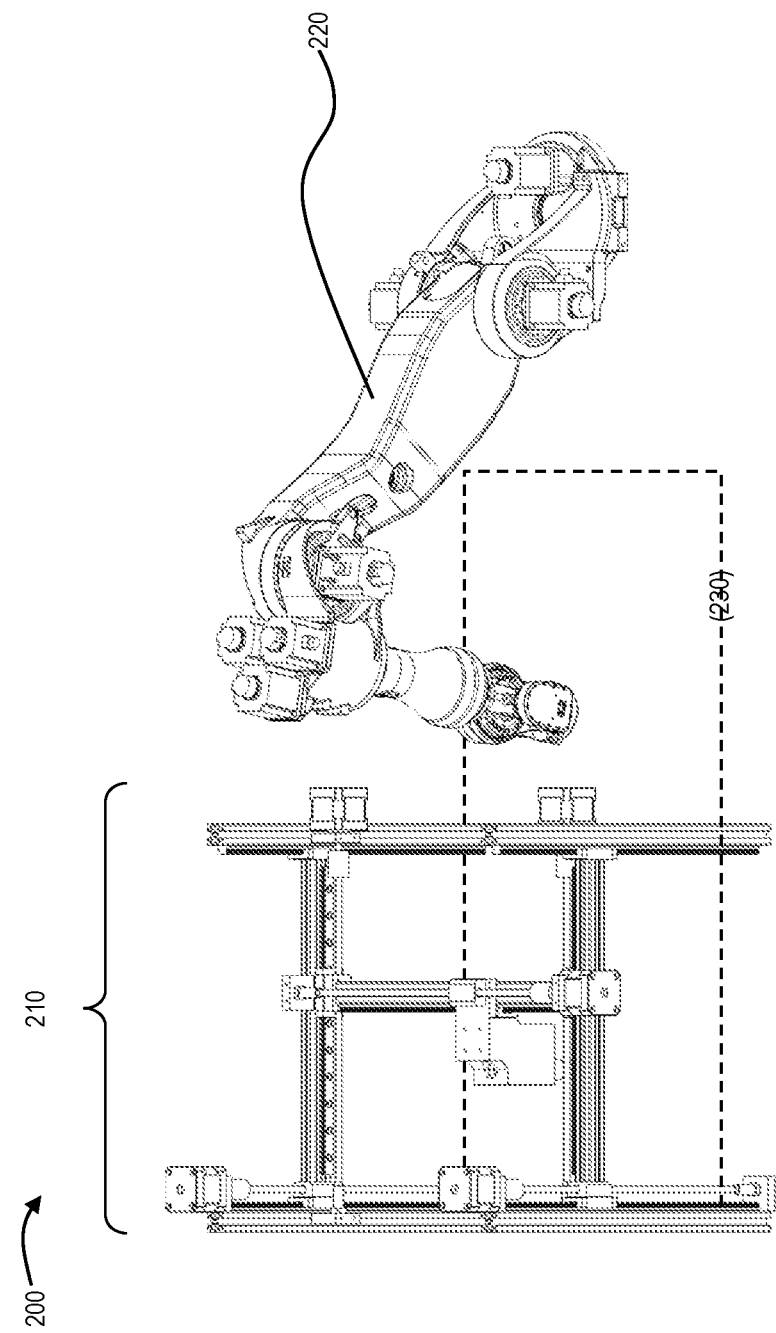
FIG. 2 illustrates another environment for inorganic binder casting including a plurality of additive material printers including an XYZ-axis additive material printer and a 6-axis additive material printer that may perform the embodiments disclose herein.

FIG. 2 illustrates another environment 200 for inorganic binder casting including a plurality of additive material printers including an XYZ-axis additive material printer 210 and a 6-axis additive material printer 220 that may perform the embodiments disclose herein. A first XYZ-axis additive material printer 210 may be positioned proximate a 6-axis additive material printer 220 to enlarge a printable area 230 upon which a shape-forming material may be printed. For example, the first XYZ-axis additive material printer 210 may print at least a portion of the shape-forming material, while the 6-axis additive material printer 220 may print at least another portion of the shape-forming material such that both additive material printers may print the complete shape-forming material for the inorganic binder casting. Both the XYZ-axis additive material printer 210 and 6-axis additive material printer 220 may be controlled from either a single controller or dual respective controllers configured to print the complete shape-forming material.

Figure 3:
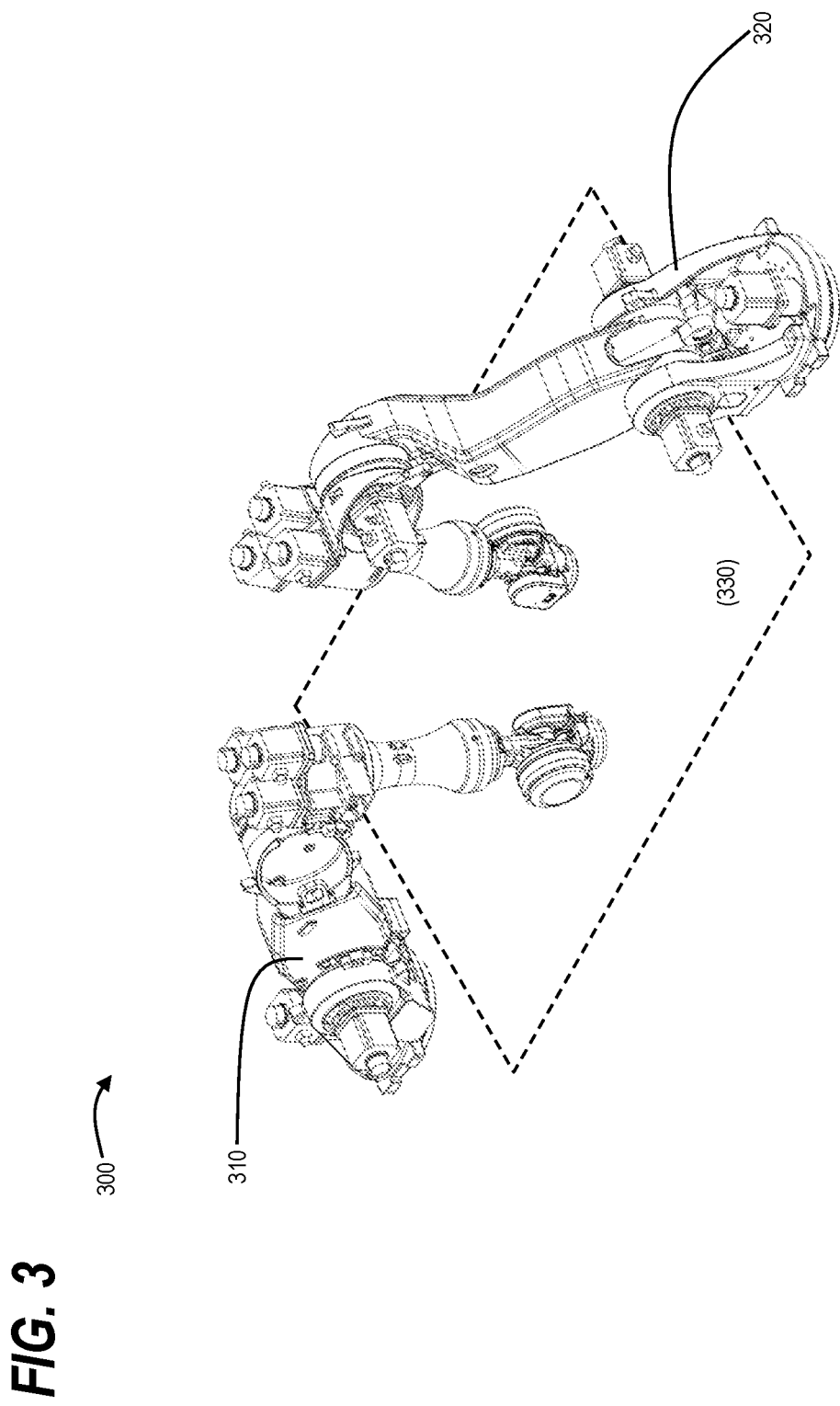
FIG. 3 illustrates another environment for inorganic binder casting including a plurality of 6-axis additive material printers that may perform the embodiments disclose herein.

FIG. 3 illustrates another environment 300 for inorganic binder casting including a plurality of 6-axis additive material printers that may perform the embodiments disclose herein. A first 6-axis additive material printer 310 may be positioned proximate a second 6-axis additive material printer 320 to enlarge a printable area 330 upon which a shape-forming material may be printed. For example, the first 6-axis additive material printer 310 may print at least a portion of the shape-forming material, while the second 6-axis additive material printer 320 may print at least another portion of the shape-forming material such that both additive material printers may print the complete shape-forming material for the inorganic binder casting. Both the first 310 and second 320 6-axis additive material printers may be controlled from either a single controller or dual respective controllers configured to print the complete shape-forming material.

One representative embodiment disclosed herein includes a method for inorganic binder casting, including selecting a shape-forming material based on pre-determined manufacturing and shape characteristics, forming the shape-forming material by printing the shape-forming material using a plurality of additive material printers to form a casting mold, creating a liquid binder solution, the liquid binder solution configured to include at least 51% inorganic binder material by weight, the inorganic binder material having a weight ratio to the liquid binder solution between a range of 1.0 and 3.5, coating the shape-forming material with the liquid binder solution, substantially dehydrating the shape-forming material, pouring a hot liquid metal into the casting mold; and allowing said hot liquid metal to cool to form a molded part.

Another related representative embodiment of forming the shape-forming material by printing the shape-forming material using the plurality of additive material printers to form the casting mold further includes providing at least one XYZ-axis additive material printer, printing at least a first portion of the shape-forming material with the at least one XYZ-axis additive material printer, and printing at least a second portion of the shape-forming material with another of the plurality of additive material printers.

Another related representative embodiment of forming the shape-forming material by printing the shape-forming material using the plurality of additive material printers to form the casting mold further includes providing at least one 6-axis additive material printer, printing at least a first portion of the shape-forming material with the at least one 6-axis additive material printer, and printing at least a second portion of the shape-forming material with another of the plurality of additive material printers.

Another related representative embodiment of forming the shape-forming material by printing the shape-forming material using the plurality of additive material printers to form the casting mold further includes providing at least two XYZ-axis additive material printers, printing at least a first portion of the shape-forming material with one of the at least two XYZ-axis additive material printers, and printing at least a second portion of the shape-forming material with a second of the at least two XYZ-axis additive material printers.

Another related representative embodiment of forming the shape-forming material by printing the shape-forming material using the plurality of additive material printers to form the casting mold further includes providing at least two 6-axis additive material printers, printing at least a first portion of the shape-forming material with one of the at least two 6-axis additive material printers, and printing at least a second portion of the shape-forming material with a second of the at least two 6-axis additive material printers.

Another related representative embodiment of forming the shape-forming material by printing the shape-forming material using the plurality of additive material printers to form the casting mold further includes providing at least one XYZ-axis additive material printer and a 6-axis additive material printer, printing at least a first portion of the shape-forming material with the XYZ-axis additive material printer, and printing at least a second portion of the shape-forming material with the 6-axis additive material printer.

Another related representative embodiment of substantially dehydrating the shape-forming material further comprises heating the shape-forming material before pouring the hot liquid metal into the casting mold, wherein the casting mold comprises a thin shell-like structure configured to receive the hot liquid metal.

Another related representative embodiment further includes washing the shape-forming material from the molded part with a solvent, and reclaiming the inorganic binder material and the shape-forming material based on washing the shape-forming material.

Another related representative embodiment further includes printing a second casting mold using at least a portion of the reclaimed shape-forming material with the plurality of additive material printers, creating a second liquid inorganic binder solution comprising at least a portion the reclaimed inorganic binder material, the second liquid solution being comprised of at least 51% inorganic material by weight, and coating the at least a portion of reclaimed shape-forming material with the second liquid inorganic binder solution.

Another related representative embodiment further includes washing the shape-forming material from the investment casting part with a solvent, and reclaiming the inorganic binder material and the shape-forming material based on washing the shape-forming material.

Another related representative embodiment of further includes printing a second investment casting shell having a second thin interior wall configured to receive a hot liquid metal using at least a portion of the reclaimed shape-forming material with the at least one additive material printers, creating a second liquid inorganic binder solution comprising at least a portion the reclaimed inorganic binder material, the second liquid solution being comprised of at least 51% inorganic material by weight, and coating the at least a portion of the reclaimed shape-forming material with the second liquid inorganic binder solution.

A further representative embodiment of a method for inorganic binder casting includes selecting a shape-forming material based on pre-determined manufacturing and shape characteristics, forming the shape-forming material by printing the shape-forming material using at least one additive material printer to form an investment casting shell having a thin interior wall configured to receive a hot liquid metal, creating a liquid binder solution, the liquid binder solution configured to include at least 51% inorganic binder material by weight, the inorganic binder material having a weight ratio to the liquid binder solution between a range of 1.0 and 3.5, coating the shape-forming material with the liquid binder solution, heating and substantially dehydrating the shape-forming material, pouring the hot liquid metal into the investment casting shell, and allowing said hot liquid metal to cool to form an investment casting part.

Another related representative embodiment further includes washing the shape-forming material from the investment casting part with a solvent, and reclaiming the inorganic binder material and the shape-forming material based on washing the shape-forming material.

Another related representative embodiment further includes printing a second investment casting shell having a second thin interior wall configured to receive a hot liquid metal using at least a portion of the reclaimed shape-forming material with the at least one additive material printers, creating a second liquid inorganic binder solution comprising at least a portion the reclaimed inorganic binder material, the second liquid solution being comprised of at least 51% inorganic material by weight, and coating the at least a portion of the reclaimed shape-forming material with the second liquid inorganic binder solution.

A further representative embodiment of a method for inorganic binder casting includes selecting a shape-forming material based on pre-determined manufacturing and shape characteristics, forming the shape-forming material by printing the shape-forming material using at least one additive material printer to form a casting mold, creating a liquid binder solution, the liquid binder solution configured to include at least 51% inorganic binder material by weight, the inorganic binder material having a weight ratio to the liquid binder solution between a range of 1.0 and 3.5, coating the shape-forming material with the liquid binder solution, heating the shape-forming material configured to polymerize the shape-forming material with the liquid binder solution and remove a substantial portion of the liquid binder solution, pouring a hot liquid metal into the casting mold, and allowing said hot liquid metal to cool to form a molded part.

Another related representative embodiment further includes heating the shape-forming material occurs before pouring the hot liquid metal into the casting mold.

Another related representative embodiment further includes heating the shape-forming material occurs for each successive layer during the forming of the shape-forming material when printing the shape-forming material using the at least one additive material printer to form the casting mold.

Another related representative embodiment further includes heating the shape-forming material occurs after pouting the hot liquid metal into the casting mold.

Another related representative embodiment further includes heating the shape-forming material further comprises applying microwave radiation to the shape-forming material.

Another related representative embodiment further includes heating the shape-forming material further comprises applying infrared radiation to the shape-forming material.

Another related representative embodiment further includes washing the shape-forming material from the molded part with a solvent, and reclaiming the inorganic binder material and the shape-forming material based on washing the shape-forming material.

Another related representative embodiment further includes printing a second casting mold using at least a portion of the reclaimed shape-forming material with the plurality of additive material printers, creating a second liquid inorganic binder solution comprising at least a portion the reclaimed inorganic binder material, the second liquid solution being comprised of at least 51% inorganic material by weight, and coating the at least a portion of reclaimed shape-forming material with the second liquid inorganic binder solution.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

As such, those skilled in the art will appreciate that the conception upon which this disclosure is based may readily be utilized as a basis for the designing of other structures, methods and systems for carrying out the several purposes of the present invention. It is important, therefore, that the description be regarded as including such equivalent constructions insofar as they do not depart from the spirit and scope of the present invention.

What is claimed is:

1. A method for forming an inorganic binder casting mold, comprising:
    selecting a shape-forming material based on pre-determined manufacturing and shape characteristics;
    forming the shape-forming material by printing the shape-forming material using a plurality of additive material printers to form a complete shape of an inorganic binder casting mold;
    creating a liquid binder solution, the liquid binder solution configured to include at least 51% inorganic binder material by weight, the inorganic binder material having a weight ratio to the liquid binder solution between a range of 1.0 and 3.5;
    coating the shape-forming material with the liquid binder solution;
    substantially dehydrating the shape-forming material to remove the liquid binder solution from the shape-forming material thereby producing the casting mold;
    washing the shape-forming material from the casting molded part with a solvent; and reclaiming the inorganic binder material and the shape-forming material based on washing the shape-forming material, wherein the casting mold is configured to receive a hot liquid metal and form an investment casting part upon cooling of the hot liquid metal.

2. The method for forming the inorganic binder casting mold according to claim 1, wherein forming the shape-forming material by printing the shape-forming material using the plurality of additive material printers to form the complete shape of the inorganic binder casting mold further comprises:

providing at least one XYZ-axis additive material printer;
printing at least a first portion of the shape-forming material with the at least one XYZ-axis additive material printer; and
printing at least a second portion of the shape-forming material with another of the plurality of additive material printers.

3. The method for forming the inorganic binder casting mold according to claim 1, wherein forming the shape-forming material by printing the shape-forming material using the plurality of additive material printers to form the single shape of the inorganic binder casting mold further comprises:

providing at least one 6-axis additive material printer;
printing at least a first portion of the shape-forming material with the at least one 6-axis additive material printer; and
printing at least a second portion of the shape-forming material with another of the plurality of additive material printers.

4. The method for forming the inorganic binder casting mold according to claim 1, wherein forming the shape-forming material by printing the shape-forming material using the plurality of additive material printers to form the single shape of the inorganic binder casting mold further comprises:

providing at least two XYZ-axis additive material printers;
printing at least a first portion of the shape-forming material with one of the at least two XYZ-axis additive material printers; and
printing at least a second portion of the shape-forming material with a second of the at least two XYZ-axis additive material printers.

5. The method for forming the inorganic binder casting mold according to claim 1, wherein forming the shape-forming material by printing the shape-forming material using the plurality of additive material printers to form the single shape of the inorganic binder casting mold further comprises:

providing at least two 6-axis additive material printers;
printing at least a first portion of the shape-forming material with one of the at least two 6-axis additive material printers; and
printing at least a second portion of the shape-forming material with a second of the at least two 6-axis additive material printers.

6. The method for forming the inorganic binder casting mold according to claim 1, wherein forming the shape-forming material by printing the shape-forming material using the plurality of additive material printers to form the complete shape of the inorganic binder casting mold further comprises:

providing at least one XYZ-axis additive material printer and a 6-axis additive material printer;
printing at least a first portion of the shape-forming material with the XYZ-axis additive material printer; and
printing at least a second portion of the shape-forming material with the 6-axis additive material printer.

7. The method for forming the inorganic binder casting mold according to claim 1, wherein substantially dehydrating the shape-forming material further comprises heating the shape-forming material before pouring the hot liquid metal into the casting mold, wherein the casting mold comprises a shell structure configured to receive the hot liquid metal.

8. The method for forming the inorganic binder casting mold according to claim 1, further comprising:

printing a second casting mold using at least a portion of the reclaimed shape-forming material with the plurality of additive material printers;
creating a second liquid inorganic binder solution comprising at least a portion the reclaimed inorganic binder material, the second liquid solution being comprised of at least 51% inorganic material by weight; and
coating the at least a portion of reclaimed shape-forming material with the second liquid inorganic binder solution.

9. The method for forming the inorganic binder casting mold according to claim 1, further comprising:

washing the shape-forming material from an investment casting part with a solvent; and
reclaiming the inorganic binder material and the shape-forming material based on washing the shape-forming material.

10. The method for forming the inorganic binder casting mold according to claim 9, further comprising:

printing an investment casting shell having an interior wall configured to receive a hot liquid metal using at least a portion of the reclaimed shape-forming material with the plurality of additive material printers;
creating a second liquid inorganic binder solution comprising at least a portion the reclaimed inorganic binder material, the second liquid solution being comprised of at least 51% inorganic material by weight; and
coating the at least a portion of the reclaimed shape-forming material with the second liquid inorganic binder solution.

11. A method for forming an inorganic binder investment casting shell, comprising:

selecting a shape-forming material based on pre-determined manufacturing and shape characteristics;
forming the shape-forming material by printing the shape-forming material using a plurality of additive material printers to form a complete shape of an investment casting shell having an interior wall configured to receive a hot liquid metal;
creating a liquid binder solution, the liquid binder solution configured to include at least 51% inorganic binder material by weight, the inorganic binder material having a weight ratio to the liquid binder solution between a range of 1.0 and 3.5;
coating the shape-forming material with the liquid binder solution;
heating and substantially dehydrating the shape-forming material to remove the liquid binder solution from the shape-forming material thereby producing the investment casting shell;
washing the shape-forming material from the investment casting part with a solvent and reclaiming the inorganic binder material and the shape-forming material based on washing the shape-forming material, wherein the investment casting shell is configured to receive the hot liquid metal and form an investment casting part upon cooling of the hot liquid metal.

12. The method for forming the inorganic binder investment casting shell according to claim 11, further comprising:
   printing a second investment casting shell having a second interior wall configured to receive the hot liquid metal using at least a portion of the reclaimed shape-forming material with the plurality of additive material printers;
   creating a second liquid inorganic binder solution comprising at least a portion the reclaimed inorganic binder material, the second liquid solution being comprised of at least 51% inorganic material by weight; and
   coating the at least a portion of the reclaimed shape-forming material with the second liquid inorganic binder solution.

13. A method for forming an inorganic binder casting mold, comprising:
   selecting a shape-forming material based on pre-determined manufacturing and shape characteristics;
   forming the shape-forming material by printing the shape-forming material using a plurality of additive material printers to form a complete shape of an inorganic binder casting mold;
   creating a liquid binder solution, the liquid binder solution configured to include at least 51% inorganic binder material by weight, the inorganic binder material having a weight ratio to the liquid binder solution between a range of 1.0 and 3.5;
   coating the shape-forming material with the liquid binder solution;
   heating the shape-forming material configured to polymerize the shape-forming material with the liquid binder solution and remove a substantial portion of the liquid binder solution;
   washing the shape-forming material from the molded part with a solvent and
   reclaiming the inorganic binder material and the shape-forming material based on washing the shape-forming material,
   wherein the casting mold is configured to receive a hot liquid metal and form a molded part upon cooling of the hot liquid metal.

14. The method for forming the inorganic binder casting mold according to claim 13, wherein heating the shape-forming material occurs before pouring the hot liquid metal into the casting mold.

15. The method for forming the inorganic binder casting mold according to claim 14, wherein heating the shape-forming material occurs for each successive layer during the forming of the shape-forming material when printing the shape-forming material using the plurality of additive material printers to form the complete shape of the inorganic binder casting mold.

16. The method for forming the inorganic binder casting mold according to claim 13, wherein heating the shape-forming material occurs after pouring the hot liquid metal into the casting mold.

17. The method for forming the inorganic binder casting mold according to claim 16, wherein heating the shape-forming material further comprises applying microwave radiation to the shape-forming material.

18. The method for forming the inorganic binder casting mold according to claim 16, wherein heating the shape-forming material further comprises applying infrared radiation to the shape-forming material.

19. The method for forming an inorganic binder casting mold according to claim 13, further comprising:
   printing a second casting mold using at least a portion of the reclaimed shape-forming material with the plurality of additive material printers;
   creating a second liquid inorganic binder solution comprising at least a portion the reclaimed inorganic binder material, the second liquid solution being comprised of at least 51% inorganic material by weight; and
   coating the at least a portion of reclaimed shape-forming material with the second liquid inorganic binder solution.

* * * * *